US011269521B2

(12) United States Patent
Kang et al.

(10) Patent No.: US 11,269,521 B2
(45) Date of Patent: Mar. 8, 2022

(54) METHOD, DEVICE AND COMPUTER PROGRAM PRODUCT FOR PROCESSING DISK UNAVAILABILITY STATES

(71) Applicant: EMC IP Holding Company LLC, Hopkinton, MA (US)

(72) Inventors: Jianbin Kang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 16/839,348

(22) Filed: Apr. 3, 2020

(65) Prior Publication Data

US 2020/0348858 A1 Nov. 5, 2020

(30) Foreign Application Priority Data

Apr. 30, 2019 (CN) .......................... 201910361676.6

(51) Int. Cl.
*G06F 3/06* (2006.01)
*G11B 20/18* (2006.01)

(52) U.S. Cl.
CPC ............ *G06F 3/0617* (2013.01); *G06F 3/061* (2013.01); *G06F 3/0653* (2013.01); *G06F 3/0689* (2013.01); *G11B 20/18* (2013.01)

(58) Field of Classification Search
CPC ..... G06F 3/0617; G06F 3/0653; G06F 3/0689
See application file for complete search history.

(56) References Cited

U.S. PATENT DOCUMENTS

| | | | |
|---|---|---|---|
| 9,448,735 B1 * | 9/2016 | Proulx | G06F 3/0632 |
| 10,983,964 B1 | 4/2021 | Bono et al. | |
| 11,003,556 B2 | 5/2021 | Ma et al. | |
| 11,061,814 B1 | 7/2021 | O'Brien, III et al. | |
| 11,119,668 B1 | 9/2021 | Martin et al. | |
| 11,128,708 B2 | 9/2021 | Keller et al. | |
| 2009/0013213 A1 * | 1/2009 | Kalman | G06F 9/4405 714/20 |
| 2009/0044043 A1 * | 2/2009 | Cherian | G06F 11/1092 714/6.12 |
| 2013/0198563 A1 * | 8/2013 | Govindasamy | G06F 11/1662 714/6.22 |
| 2017/0192865 A1 * | 7/2017 | Pan | G06F 3/0619 |

\* cited by examiner

*Primary Examiner* — Tracy A Warren
(74) *Attorney, Agent, or Firm* — BainwoodHuang (57) ABSTRACT

Techniques for managing data involve determining multiple indications related to a status of a stripe, including a first indication to indicate whether a group of disks related to the stripe is available, a second indication to indicate whether to rebuild the stripe, and a third indication to retain a value of the first indication when a disk is unavailable; in response to detecting that a disk in the group of disks is unavailable, updating the first indication to indicate that the disk is unavailable; and in response to receiving a write operation, determining an updating to the third indication with a first value of the updated first indication; and in response to determining that the unavailable disk is available again within a predetermined time period, updating the second indication with a current value of the updated third indication, to indicate rebuilding of the stripe.

12 Claims, 5 Drawing Sheets

FIG. 5

METHOD, DEVICE AND COMPUTER PROGRAM PRODUCT FOR PROCESSING DISK UNAVAILABILITY STATES

CROSS REFERENCE TO RELATED APPLICATION

This application claims priority to Chinese Patent Application No. CN201910361676.6, on file at the China National Intellectual Property Administration (CNIPA), having a filing date of Apr. 30, 2019, and having "METHOD, DEVICE AND COMPUTER PROGRAM PRODUCT FOR MANAGING DATA" as a title, the contents and teachings of which are herein incorporated by reference in their entirety.

FIELD

Embodiments of the present disclosure relate to the field of data storage, and specifically to a method, a device and a computer program product for managing data.

BACKGROUND

A redundant array of independent disks (RAID) is a disk group formed by combining a plurality of independent disks in different manners. From a user's perspective, a redundant array of independent disks is like a disk, but it may provide a higher storage capacity than a single hard disk, and may also provide data backup. When data of a disk extent is damaged, the data backup may be used to recover the damaged data, thereby protecting security of the user's data. Different manners used for forming a disk array are called RAID Levels, such as RAID0, RAID1, RAID5, and so on.

As RAID technologies develop, data reading and writing are performed at a level of disk slices rather than a level of a disk. According to these technologies, each of the plurality of disks is divided into a plurality of disk slices. By creating a RAID with a disk slice as a unit, more flexible disk management and I/O control are achieved, and operation performance of a system is improved. However, as price of storage disks decreases, more disks are used to store data. Therefore, there is a problem about how to use more disks to process data in a RAID.

SUMMARY

Embodiments of the present disclosure provide a method, a device and a computer program product for managing data.

According to a first aspect of the present disclosure, there is provided a method of managing data. The method includes determining multiple indications related to a status of a stripe, including a first indication being used to indicate whether a group of disks related to the stripe is available, a second indication being used to indicate whether to rebuild the stripe, and a third indication being used to retain a value of the first indication when a disk is unavailable. The method further includes: in response to detecting that a disk in a group of disks is unavailable, updating the first indication to indicate that the disk is unavailable; and in response to receiving a write operation, determining an updating to the third indication with a first value of the updated first indication. The method further includes: in response to determining that the unavailable disk is available again within a predetermined time period, updating the second indication with a current value of the updated third indication, to indicate rebuilding of the stripe.

According to a second aspect of the present disclosure, there is provided an electronic device for managing data. The electronic device includes: a processor; and a memory storing computer program instructions, the processor running the computer program instructions in the memory to control the electronic device to perform acts including: determining multiple indications related to a status of a stripe, including a first indication being used to indicate whether a group of disks related to the stripe is available, a second indication being used to indicate whether to rebuild the stripe, and a third indication being used to retain a value of the first indication when a disk is unavailable; in response to detecting that a disk in a group of disks is unavailable, updating the first indication to indicate that the disk is unavailable; and in response to receiving a write operation, determining an updating to the third indication with a first value of the updated first indication; and in response to determining that the unavailable disk is available again within a predetermined time period, updating the second indication with a current value of the updated third indication, to indicate rebuilding of the stripe.

According to a third aspect of the present disclosure, there is provided a computer program product. The computer program product is tangibly stored on a non-volatile computer-readable medium and includes machine-executable instructions. The machine-executable instructions, when executed, enable a machine to perform the method according to the first aspect of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference symbols generally refer to the same components in example embodiments of the present disclosure.

Throughout the figures, the same or corresponding reference numbers represent the same or corresponding parts.

DETAILED DESCRIPTION

Embodiments of the present disclosure will be described in more detail with reference to the accompanying drawings. Although some embodiments of the present disclosure are shown in the accompany drawings, it should be appreciated that the present disclosure may be implemented in many forms and the present disclosure should not be understood as being limited to the embodiments illustrated herein. Rather, these embodiments are provided here to enable more thorough and complete understanding of the present disclosure. It should be appreciated that accompany drawings and embodiments of the present disclosure are only used for example purposes and not used to limit the protection scope of the present disclosure.

As used herein, the term "includes" and its variants are to be read as open terms that mean "includes, but is not limited to." The term "based on" is to be read as "based at least in part on." The term "one embodiment" or "the embodiment" is to be read as "at least one embodiment". Terms such as "first" and "second" may refer to different or identical objects. The text below may include other explicit and implicit definitions.

Principles of the present disclosure will be described with reference to several example embodiments shown in the figures. Although preferred embodiments of the present disclosure are shown in the figures, it should be appreciated that these embodiments are described only to enable those skilled in the art to better understand and thereby implement the present disclosure, rather than limiting the scope of the present disclosure in any manner.

Rebuilding is a common operation of a disk array. When a disk fails, data in one disk will be stored to an allocated new disk slice, or data in an original disk slice which becomes available again is updated when the disk recovers from a failed state.

When a time length of a failure of a disk slice in a stripe exceeds a predetermined time period (for example, five minutes), a new disk slice is obtained from a disk slice pool to rebuild the stripe. At this time, rebuilding is called a full rebuilding because all the data on the new disk slice needs to be rebuilt. When the faulty disk slice exits the fault state before the new disk slice is allocated or within the predetermined time length, the rebuilding begins on the original disk slice. Since part of the disk slice's data is valid, a rebuilding process will not involve valid data. This rebuilding is referred to as fast rebuilding.

A fast rebuilding may occur when the disk encounters a temporary failure. The fast rebuilding is generally performed for example upon a drive firmware upgrade, solid state drive hiccup, power glitch or drive firmware bug that cause a solid state drive to stuck.

When a temporary failure happens to the disk, the disk will reusable quickly. Therefore, most stripes formed by disk slices from a disk slice pool do not need to be rebuilt. In addition, after data in a stripe of a disk array is saved, only read operations are performed most of the time. At this time, the stripe is not updated. However, when the stripe is rebuilt, it is necessary to read the metadata of a physical large block (PLB) and a virtual logic block (VLB) within the stripe for checking. This will result in many unnecessary disk input/output operations, and cause waste of disk input/output operations.

In order to solve the above problems, embodiments of the present disclosure propose a solution for managing data. According to various embodiments of the present disclosure, three parameters related to the stripe are set. When a disk in a group of disks related to the stripe is unavailable, in the case of a write operation, a value of a first indication is transferred to a second indication by a third indication of the three indications, to indicate rebuilding the stripe. Furthermore, when no write operation occurs during recovery of the unavailable disk, the first parameter is set as an initial value without performing stripe rebuilding. Since the stripe does not need to be rebuilt, the amount of reading metadata related to the stripe is reduced, thereby reducing disk input/output operations.

Figure 1:
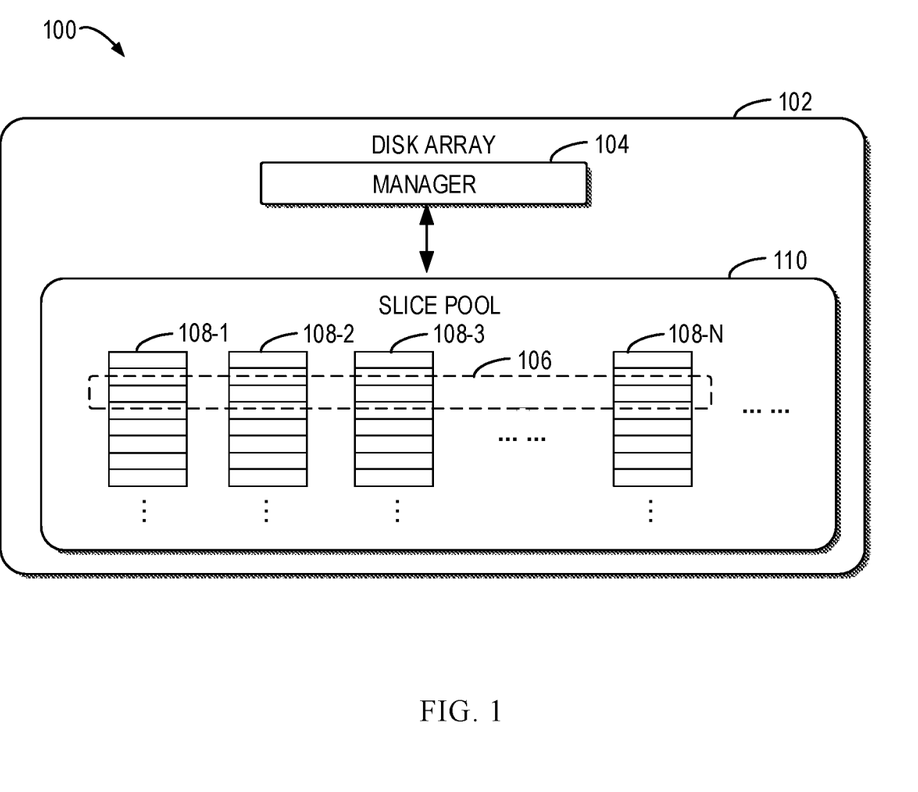
FIG. 1 illustrates a schematic diagram of a storage system 100 in which a device and/or method according to embodiments of the present disclosure can be implemented.

FIG. 1 illustrates a schematic diagram of a storage system 100 in which a device and/or method according to embodiments of the present disclosure can be implemented. As shown in FIG. 1, the storage system 100 includes a disk array 102. In one example, the disk array 102 may be a redundant array of independent disks (RAID). In another example, the disk array 102 may be any suitable type of disk array. The disk array 102 has a predetermined width. The width of the disk array 102 refers to the number of disks that make up stripes in the disk array 102. In one example, the width of the disk array 102 is 4+1 RAID5, which indicates that the number of disks that make up the stripes of the RAID 5 is 4+1, including 4 disks for storing data, and one disk for storing parity data. The above example is only for purpose of illustration rather than limiting the scope of the present disclosure.

The disk array 102 includes a manager 104. The manager 104 may be used to manage and control status of disks 108 and stripes within the disk array 102, as well as writing and reading of data.

The disk array 102 further includes a slice pool 110. The slice pool 110 includes a plurality of disks 108-1, 108-2, 108-3, . . . , 108-N, where N is a positive integer, which may be collectively referred to as disk 108 for ease of description. Each disk 108 is divided into one or more fixed size disk slices.

The size of the disk slice may be set to any value as needed. In one example, the size of the disk slice is 4 GB. In other embodiments, the disk slice may be set to any size as needed. Disk slices from the slice pool 110 may be used to form one or more stripes. As shown in FIG. 1, the disk slices from the disc 108 form a stripe 106. One stripe is equivalent to one traditional RAID.

The stripes in the disk array 102 are all provided with parameters related to the state of the stripes. These parameters may include a first parameter, also referred to as a first indication for indicating whether a set of disks related to a stripe is available; a second parameter, also referred to as a second indication for indicating whether to rebuild the stripe; a third parameter, also referred to as a third indication for maintaining the value of the first indication when the disk is unavailable.

In one example, the first indication, the second indication and the third indication are bitmaps corresponding to the disk 108 related to the stripe 106, where if a bit corresponding to the disk 108 is 0, which indicates that the disk 108 is available, and a bit corresponding to the disk 108 is 1, which indicates that the disk 108 is unavailable. The above examples are only for purpose of illustration rather than limiting the scope of the present disclosure. Those skilled in the art may set the indication information in any suitable form as needed.

When the stripe 106 is in a normal state, i.e., when the disk 108 related to the stripe 106 is available, all three parameters remain their initial values without any change. When the disk 108 related to the stripe 106 is unavailable, the first indication is changed to indicate that the disk 108 is unavailable. While the disk 108 is unavailable, if a write operation is performed on the stripe 106, the third indication is updated with the value of the first indication. If a read operation is performed on the stripe 106, the third indication remains unchanged. When the disk 108 is recovered to be available again, the second indication is updated with the current value of the third indication. If the value of the second indication is its initial value, it indicates that only a read operation has been performed during the period from the time when the disk 108 was unavailable to the time when the disk 108 becomes available again. Therefore, an upper-layer mapper does not need to perform a rebuild operation on the stripe, so that it is not necessary to read other metadata related to the stripe. However, if the value of the second indication is different from the initial value and indicates that the disk 108 is unavailable, then the disk 108 needs to be rebuilt, and other metadata related to the stripe 106 needs to be read, for example, metadata related to a physical large block.

A schematic diagram of the storage system 100 in which device and/or method in accordance with embodiments of the present disclosure can be implemented is described above with reference to FIG. 1, and a flow chart of a process 200 of managing data according to an embodiment of the present disclosure is described in detail below with reference to FIG. 2.

Figure 2:
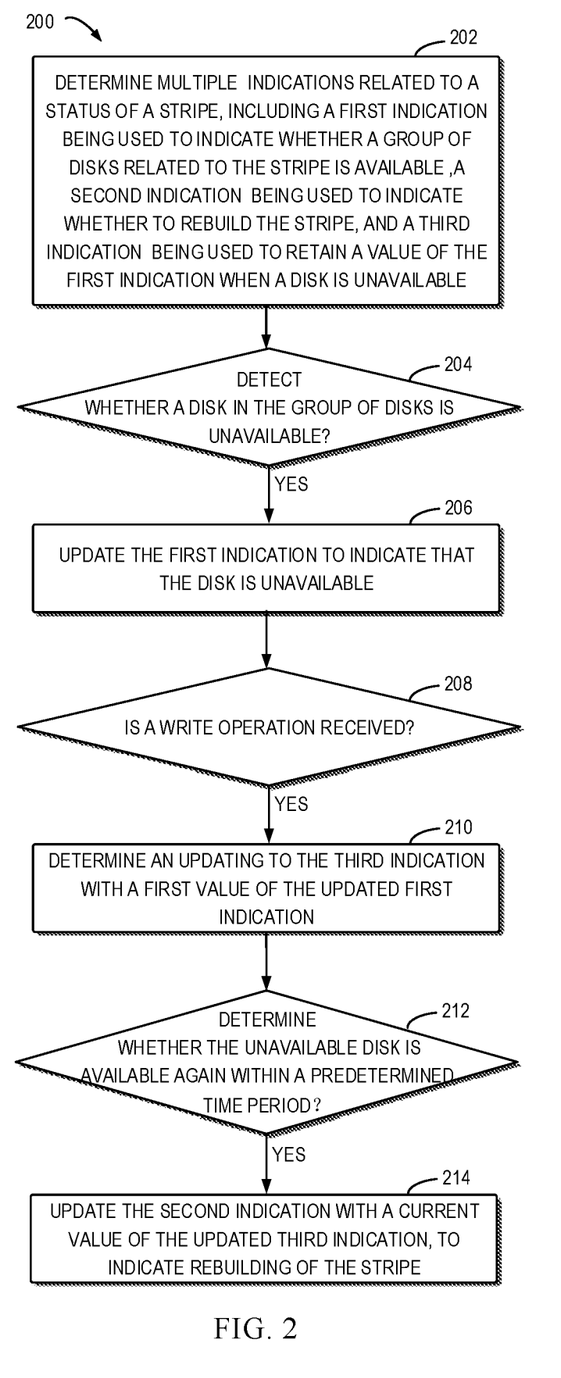
FIG. 2 illustrates a flow chart of a process 200 of managing data according to an embodiment of the present disclosure.

In FIG. 2, at block 202, a disk array (e.g., disk array 102 of FIG. 1) determines multiple indications related to the status of a stripe (e.g., stripe 106 in FIG. 1), including a first indication being used to indicate whether a group of disks related to the stripe is available, the second indication being used to indicate whether to rebuild the stripe, and the third indication being used to maintain the value of the first indication when the disk is unavailable. It should be noted that the disk array 102 illustrated in FIG. 1 is merely one example for implementing the method, and the method of the present disclosure may be implemented in any suitable disk array.

At block 204, the disk array detects if a disk in a group of disks is unavailable. When a disk in the disk array is unavailable, an instruction indicating that a disk is unavailable is usually generated. At this time, the disk array looks up status indication information related to the disk to determine whether the disk is unavailable. At block 204, when it is determined that a group of disks is available (not shown in FIG. 2), various appropriate operations may be performed as desired. In one example, when a group of disks is detected to be available, various read and write operations may be performed without updating the first indication, the second indication and the third indication. The present disclosure is directed to further processing of disk unavailability, and the examples in which the disks are available described above are only intended to illustrate the processing flow more completely, and not to specifically limit the scope of the present disclosure. Those skilled in the art may perform an operation when a group of disks are available according to needs.

When it is determined that a disk is unavailable, then at block 206, the first indication is updated to indicate that the disk is unavailable. For example, when the disk is in a normal state, the bit in the first indication which corresponds to the disk is 0. If the disk becomes unavailable, the bit in the first indication which corresponds to the disk is 1. The above examples are only for purpose of illustration, rather than limiting the scope of the present disclosure.

During a period when the disk is unavailable, at block 208, it is determined whether a write operation is received. If a write operation is received, at block 210 an updating to the third indication with a first value of the updated first indication is determined, and the value of the second indication remains unchanged. A process of updating the third indication with the first value of the first indication will be described in detail in FIG. 4 below.

If it is determined that at block 208 no write operation is received (not shown in FIG. 2), any suitable operation may be set based on needs. In one example, if read operations are received, then the third indication remains unchanged. At this time, the values of the first and second indications also remain unchanged. In a further example, if write operation is not received and a read operation is not received, then no operation processing is performed. It should be appreciated here that the above-described processing examples in which a write operation is not received are only for purpose of illustration rather than specifically limiting the scope of the present disclosure. Those skilled in the art may set, according to needs, any suitable operation when a write operation is not received.

At block 212, it is determined whether the unavailable disk is available again within a predetermined time period. In order to guarantee performance of the disk array, a predetermined time period is usually set to wait for disk recovery. In one example, the predetermined time period is five minutes. If the disk recovers within the predetermined time period, it indicates that the disk may still be used. Therefore, it is only necessary to rebuild the disk slice related to the stripe which is on the disk. In an event that the disk is available again, the second indication is updated with a current value of the updated third indication, to indicate rebuilding of the stripe at block 214.

At block 212, if it is determined that the unavailable disk is not available again within the predetermined time period (not shown in FIG. 2), in order to protect the availability of the disk array, a new disk slice is allocated for the stripe. The second indication is then updated with the same value as the value in the first indication, to rebuild the stripe based on the second indication. At this time, it is necessary to read data on other disks related to the stripe, then perform an exclusive OR operation to obtain the data on the unavailable disk, and then store the data in the newly allocated disk slice.

In some embodiments, the updated second indication is its initial value, which indicates that the stripe does not need to be rebuilt. Although the disk is unavailable, since the value of the second indication is an initial value, it indicates that a write operation is not performed for the stripe while the disk is unavailable. Since the write operation is not performed and the data on the disk is not updated, the stripe does not need to be rebuilt.

In some embodiments, if the updated second indication is a value different from the initial value, it indicates that a write operation is performed to the stripe during the period that the disk is unavailable, and the data in the stripe is changed. Therefore, the stripe needs to be rebuilt. If a mapper for reading data from or writing data to the disk array determines that the value of the third indication of the stripe is a non-initial value, a rebuild command will be sent to the disk array to ensure correctness of the data.

With the above method, it is possible not to read metadata of physical large block and virtual logic block in the stripe, when the write operation is not performed during unavailability of the disk that is related to the stripe and is available again. As compared with conventional solutions in which metadata of physical large block and virtual logic block in the stripe still needs to be read when the write operation is not performed, the above method reduces input/output operations of the metadata related to the stripe, thereby improving a utilization rate of disk array.

Figure 3:
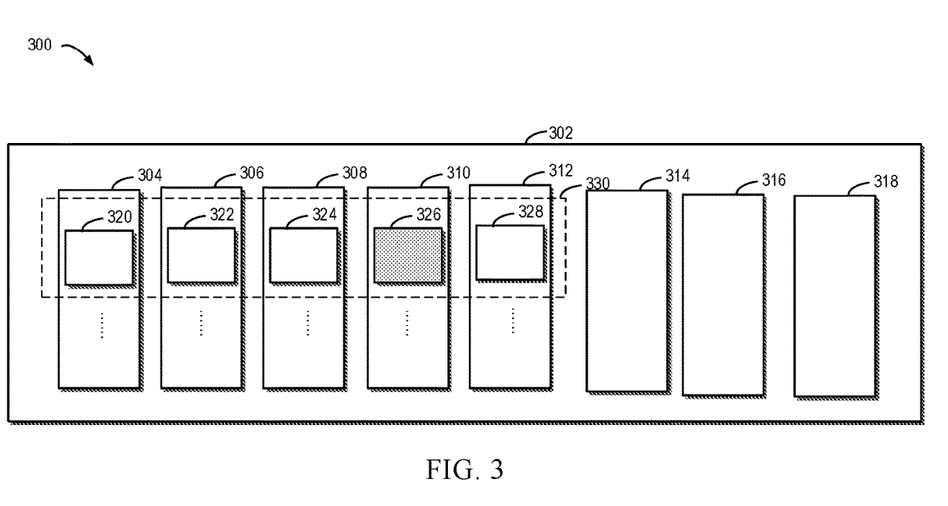
FIG. 3 illustrates a schematic diagram of a storage system 300 according to an embodiment of the present disclosure.

In order to specifically describe a flowchart of the process 200 of managing data according to an embodiment of the present disclosure shown in FIG. 2, description will be made below with reference to an example storage system of FIG. 3. FIG. 3 shows a schematic diagram of a storage system 300 according to an embodiment of the present disclosure. It should be appreciated that FIG. 3 is only for purpose of illustration rather than specifically limiting the scope of the present disclosure.

In FIG. 3, the disk array 302 includes eight disks 304, 306, 308, 310, 312, 314, 316 and 318. The disks 304, 306, 308, 310, 312, 314, 316 and 318 are divided into a plurality of disk slices. A disk slice 320 in the disk 304, a disk slice 322 in the disk 306, a disk slice 324 in the disk 308, a disk slice 326 in the disk 310 and a disk slice 328 in the disk 312 form a stripe 330. A width of the stripe 330 corresponding to the disk array 302 is 4+1.

Three indications of the stripe 324 are stored in the disk array 302, where the first indication indicates whether the disks 304, 306, 308, 310 and 312 related to the stripe 324 are available, and its initial value is 0X0; the second indication is used to indicate whether the stripe 324 will be rebuilt, and its initial value is 0X0; the third indication is used to retain the value of the first indication while the disk is unavailable, and its initial value is 0X0.

If the disk 310 is unavailable, then the value of the first indication related to the stripe 324 will be updated to 0X8. At this time, the values of both the second and third indications are initial values. If a write operation is once performed on the stripe 330 while the disk 310 is unavailable, the third indication is updated with the value 0X8 of the first indication. Alternatively or additionally, when the write operation is performed on the stripe 330 only once while the disk is unavailable, the third indication is updated with the value of the first indication.

If the write operation is not performed and only read operation is performed while the disk 310 is unavailable, the values of the first indication, the second indication and third indication remain unchanged.

If the disk 310 becomes available again during a predetermined time period, for example five minutes, the second indication is updated with the current value of the third indication of the stripe 330. If the write operation is not performed during the period that the disk 310 is unavailable, the current value of the third indication is the initial value, and then the updated second value is still the initial value, which indicates that the stripe 330 does not need to be updated. And if the write operation is performed during the period that the disk 310 is unavailable, then the current value of the third indication is 0X8. After the second indication is updated with the current value of the third indication, the value of the second indication is 0X8, indicating that the stripe 330 needs to be rebuilt.

If the disk 310 is always unavailable during the predetermined period of time, the disk array 302 will allocate a new disk slice for the stripe 330, for storing data on the disk slice 326. At this time, the second indication is updated with the value 0X8 of the updated first indication while the disk 310 is unavailable, to indicate that the stripe 330 needs to be updated.

A schematic diagram of the storage system 300 in which the method of the present disclosure can be used is described above with reference to FIG. 3. An example flow for updating the third indication as shown in the block 210 of FIG. 2 will be described in detail below with reference to FIG. 4.

Figure 4:
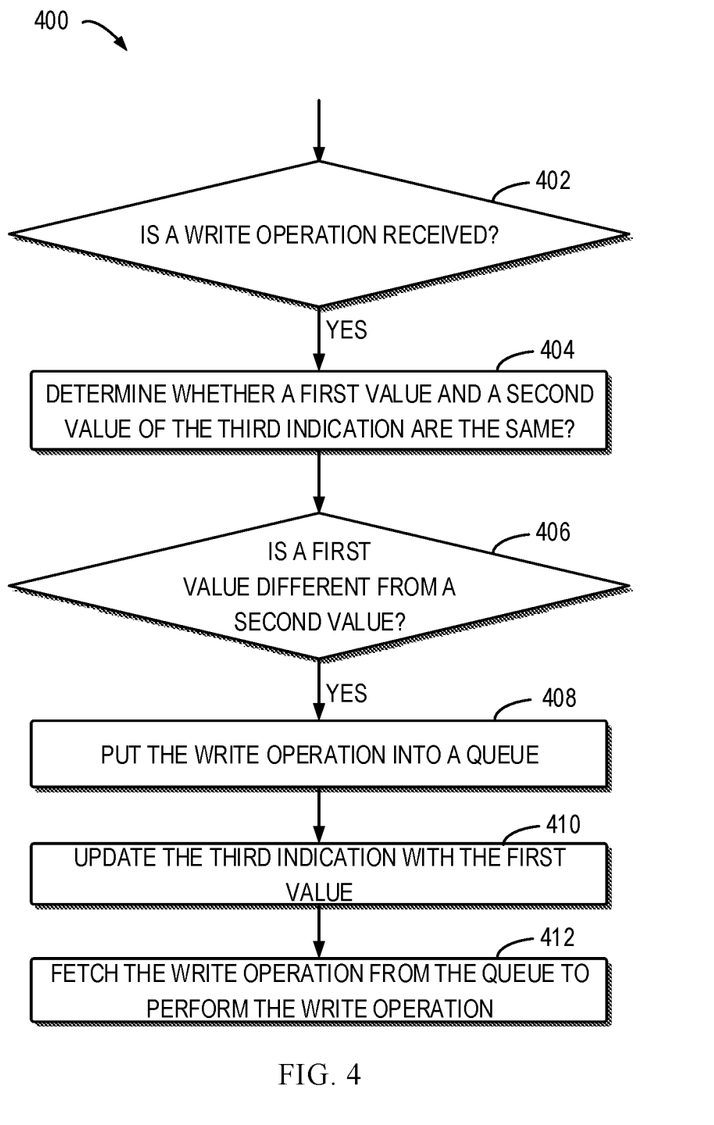
FIG. 4 illustrates a flow chart of a process 400 of performing a write operation according to an embodiment of the present disclosure.

FIG. 4 illustrates a flow chart of a process 400 of performing a write operation according to an embodiment of the present disclosure.

In FIG. 4, when it is detected that a disk in a group of disks is unavailable, it is determined, at block 402, whether a write operation is received. If the write operation is not received (not shown in FIG. 4), any suitable operation may be set as needed. In one example, if a read operation is received, the third indication is maintained unchanged. At this time, the values of both the first indication and the second indication also remain unchanged. In one example, if a write operation is not received and a read operation is not received and then no operation processing is performed. The above examples are only for purpose of illustration rather than specifically limiting the scope of the present disclosure. Those skilled in the art may set any suitable operation as needed when a write operation is not received.

If a write operation is received, it is determined at block 404 whether the first value of the first indication indicating the status of the stripe and the second value of the third indication indicating the status of the stripe are the same.

At block 406, it is determined whether the first value of the first indication is different from the second value of the third indication. If it is determined that the first value of the first indication is equal to the second value of the third indication (not shown in FIG. 4), this indicates that a write operation is already performed on the disk array before, whereupon the value of the third indication is already updated. Therefore, it is not necessary to update the value of the third indication, but to directly perform the write operation.

If the two values are different, this indicates that the write operation is performed on the stripe the first time after the disk becomes unavailable. At this time, at block 408, the write operation is placed in a queue. Then, at block 410, the third indication is updated with the first value. At block 412, a write operation is fetched from the queue for performing the write operation.

With the above method, it is possible to quickly perform a write operation while the disk is unavailable; particularly after the write operation has already been performed, thereby reducing excessive operations of updating the third indication and improving efficiency of the data processing.

Figure 5:
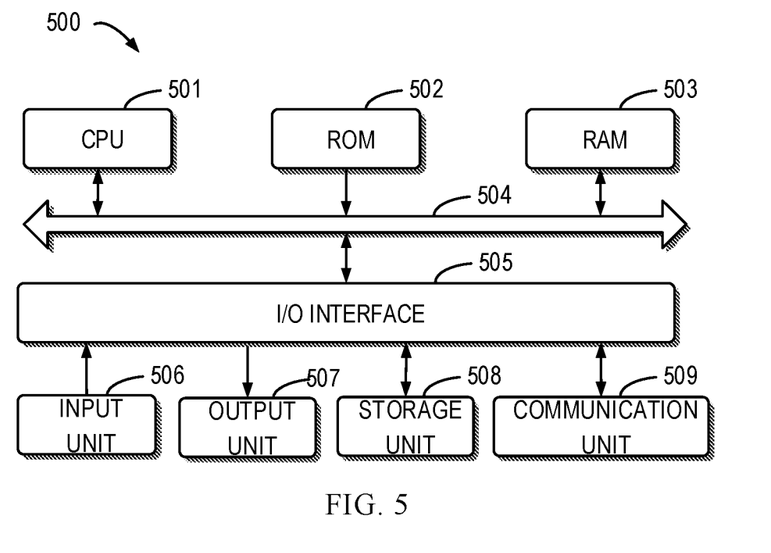
FIG. 5 illustrates a block diagram of an example device 500 adapted to implement an embodiment of the present disclosure.

FIG. 5 illustrates a schematic block diagram of an example device 500 that may be used to implement an embodiment of the present disclosure. For example, any one of 102, 104 and 110 shown in FIG. 1, 302 shown in FIG. 3 may be implemented by the device 500. As shown, the device 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. Various programs and data needed in the operation of the device 500 may also be stored in the RAM 503. The CPU 501, ROM 502 and RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507, e.g., various displays and loudspeakers; the storage unit 508 such as a magnetic disk, an optical disk or the like; and a communication unit 509 such as a network card, a modem, a radio communication transceiver. The communication unit 509 allows the device 500 to exchange information/data with other devices via a computer network such as Internet and/or various telecommunication networks.

The above-described procedures and processes such as methods 200 and 400 may be implemented by the processing unit 501. For example, in some embodiments, the methods 200 and 400 may be implemented as a computer software program, which is tangibly included in a machine-readable medium such as the storage unit 508. In some embodiments, part or the entire computer program may be loaded and/or installed on the device 500 via the ROM 502 and/or the communication unit 509. When the computer program is uploaded to the RAM 503 and executed by the CPU 501, one or more steps of the above methods 200 and 400 may be implemented.

The present disclosure may be a method, a device, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As disclosed herein, it is possible to significantly reduce the number of input/output operations which are related to the rebuilding of the stripe and are needed to be performed when the unavailable disk is available again, and improve data processing efficiency.

We claim:

1. A method of managing data, comprising:
   determining multiple indications related to a status of a stripe, the multiple indications including a first indication indicating whether a group of disks related to the stripe is available, a second indication indicating whether to rebuild the stripe, and a third indication maintaining, upon receipt of a write operation, a value of the first indication when the group of disks is unavailable, each of the first indication, the second indication, and the third indication having an initial value;
   in response to detecting that the group of disks is unavailable, updating the first indication with a first value to indicate that the group of disks is unavailable;
   in response to receiving a read operation when the group of disks is unavailable, maintaining the initial value of the third indication unchanged;
   in response to receiving a write operation when the group of disks is unavailable, updating the third indication with the first value of the updated first indication;
   in response to determining that the unavailable group of disks is available again within a predetermined time period;
      updating the second indication with a current value of the third indication;
      in response to the second indication being updated with the current value equal to the initial value, avoiding rebuilding the stripe; and
      in response to the second indication being updated with the current value different from the initial value, rebuilding of the stripe; and
   in response to determining that the unavailable group of disks is not available again in the predetermined time period:
      allocating a new disk slice for the stripe;
      updating the second indication with the first value of the updated first indication; and
      rebuilding the stripe.

2. The method according to claim 1, wherein updating the third indication with the first value of the updated first indication comprises:
   in response to receiving the write operation, determining whether the first value and the current value of the third indication are the same; and
   in response to determining that the first value is different from the current value;
      putting the write operation into a queue;
      updating the third indication with the first value; and
      fetching the write operation from the queue to perform the write operation.

3. The method according to claim 2, wherein updating the third indication with the first value of the updated first indication comprises:
   in response to determining that the first value is equal to the current value, performing the write operation.

4. The method according to claim 1, wherein the updated second indication having the initial value indicates the stripe does not need to be rebuilt.

5. An electronic device for managing data, comprising:
   a processor; and
   a memory storing computer program instructions, the processor running the computer program instructions in the memory to control the electronic device to perform acts comprising:
      determining multiple indications related to a status of a stripe, the multiple indications including a first indication indicating whether a group of disks related to the stripe is available, a second indication indicating whether to rebuild the stripe, and a third indication maintaining, upon receipt of a write operation, a value of the first indication when the group of disks is unavailable, each of the first indication, the second indication, and the third indication having an initial value;
      in response to detecting that the group of disks is unavailable, updating the first indication with a first value to indicate that the group of disks is unavailable;
      in response to receiving a read operation when the group of disks is unavailable, maintaining the initial value of the third indication unchanged;
      in response to receiving a write operation when the group of disks is unavailable, updating the third indication with the first value of the updated first indication;
      in response to determining that the unavailable group of disks is available again within a predetermined time period;
         updating the second indication with a current value of the third indication;
         in response to the second indication being updated with the current value equal to the initial value, avoiding rebuilding the stripe; and
         in response to the second indication being updated with the current value different from the initial value, rebuilding of the stripe; and
      in response to determining that the unavailable group of disks is not available again in the predetermined time period:
         allocating a new disk slice for the stripe;
         updating the second indication with the first value of the updated first indication; and
         rebuilding the stripe.

6. The electronic device according to claim 5, wherein updating the third indication with the first value of the updated first indication comprises:
   in response to receiving the write operation, determining whether the first value and the current value of the third indication are the same; and
   in response to determining that the first value is different from the current value;
      putting the write operation into a queue;
      updating the third indication with the first value; and
      fetching the write operation from the queue to perform the write operation.

7. The electronic device according to claim 6, wherein updating the third indication with the first value of the updated first indication comprises:
   in response to determining that the first value is equal to the current value, performing the write operation.

8. The electronic device according to claim 5, wherein the updated second indication having the initial value indicates that the stripe does not need to be rebuilt.

9. A computer program product having a non-transitory computer readable medium which stores a set of instructions to manage data; the set of instructions, when carried out by computerized circuitry, causing the computerized circuitry to perform a method of:
   determining multiple indications related to a status of a stripe, the multiple indications including a first indication indicating whether a group of disks related to the stripe is available, a second indication indicating whether to rebuild the stripe, and a third indication maintaining, upon receipt of a write operation, a value of the first indication when the group of disks is unavailable, each of the first indication, the second indication, and the third indication having an initial value;
   in response to detecting that the group of disks is unavailable, updating the first indication with a first value to indicate that the group of disks is unavailable;
   in response to receiving a read operation when the group of disks is unavailable, maintaining the initial value of the third indication unchanged;
   in response to receiving a write operation when the group of disks is unavailable, updating the third indication with the first value of the updated first indication;
   in response to determining that the unavailable group of disks is available again within a predetermined time period;
   updating the second indication with a current value of the third indication;
   in response to the second indication being updated with the current value equal to the initial value, avoiding rebuilding the stripe; and
   in response to the second indication being updated with the current value different from the initial value, rebuilding of the stripe; and
   in response to determining that the unavailable group of disks is not available again in the predetermined time period:
   allocating a new disk slice for the stripe;
   updating the second indication with the first value of the updated first indication; and
   rebuilding the stripe.

10. The computer program product according to claim 9, wherein updating the third indication with the first value of the updated first indication comprises:
   in response to receiving the write operation, determining whether the first value and the current value of the third indication are the same; and
   in response to determining that the first value is different from the current value:
   putting the write operation into a queue;
   updating the third indication with the first value; and
   fetching the write operation from the queue to perform the write operation.

11. The computer program product according to claim 10, wherein updating the third indication with the first value of the updated first indication comprises:
   in response to determining that the first value is equal to the current value, performing the write operation.

12. The computer program product according to claim 9, wherein the updated second indication having the initial value indicates the stripe does not need to be rebuilt.

* * * * *